N. POWER.
SAFETY DEVICE FOR MOTION PICTURE PROJECTING MACHINES.
APPLICATION FILED JAN. 6, 1913.
1,191,224.
Patented July 18, 1916.
2 SHEETS—SHEET 1.
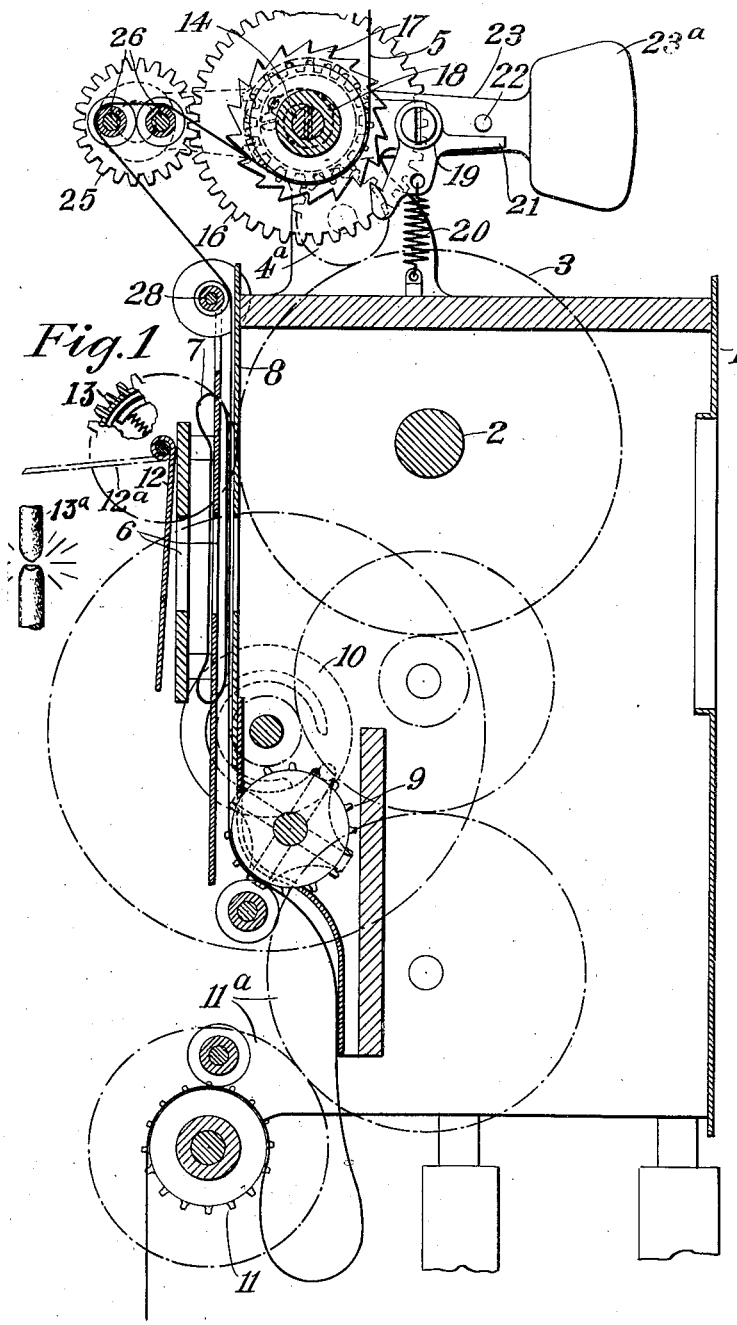
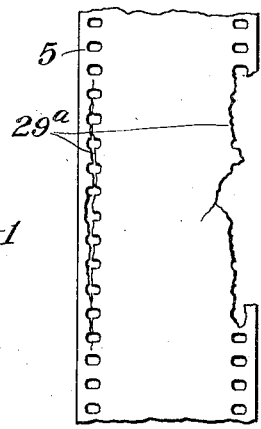
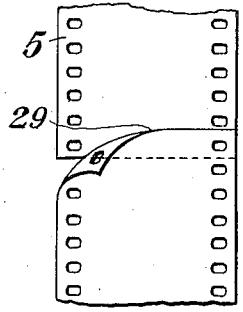
Witnesses:
W. B. Morton
L. E. Johnston
Inventor
Nicholas Power
By his Attorneys
Merwin & Swenarton

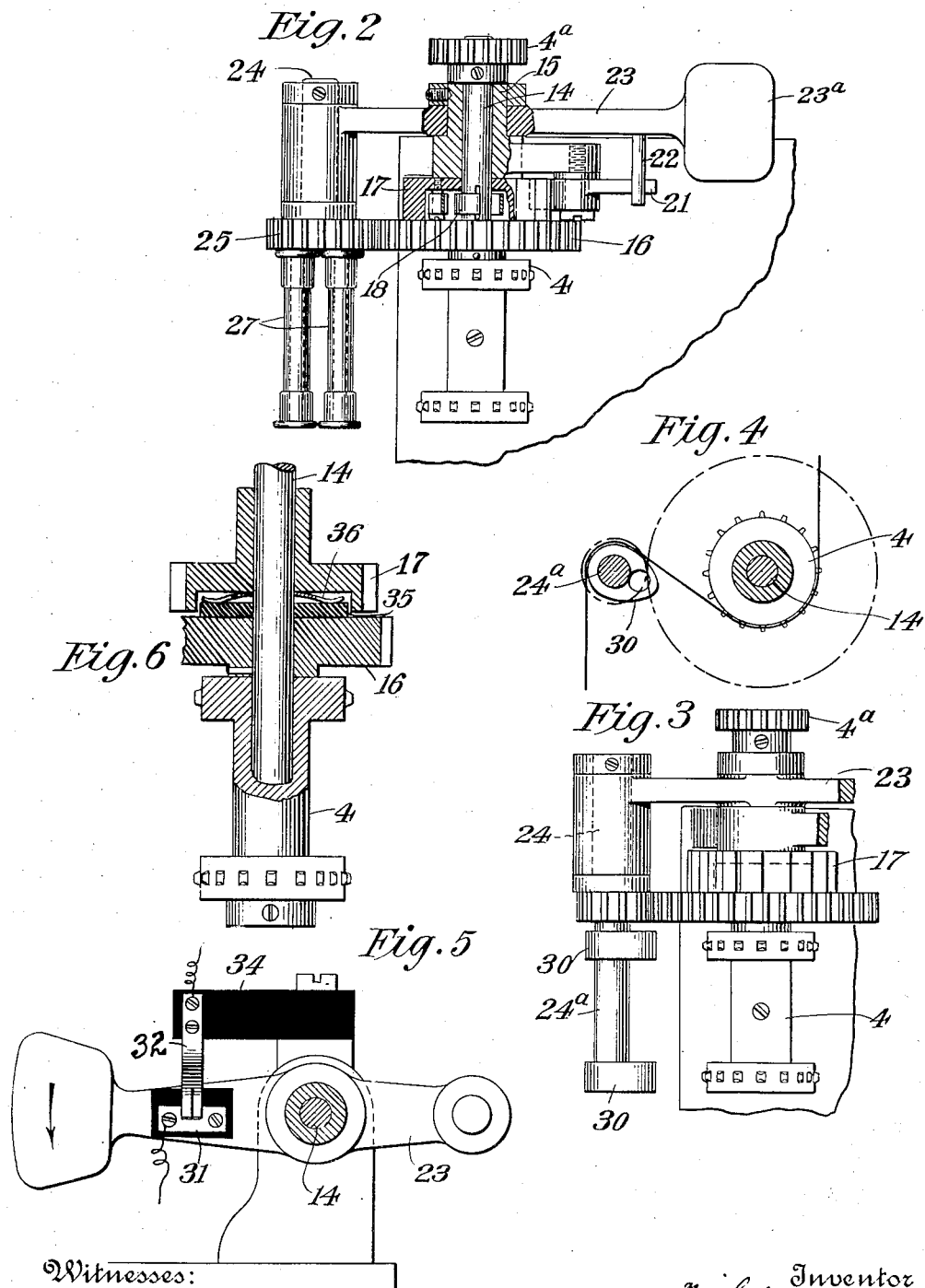

UNITED STATES PATENT OFFICE.

NICHOLAS POWER, OF BROOKLYN, NEW YORK, ASSIGNOR TO NICHOLAS POWER COMPANY, OF NEW YORK, N. Y., A CORPORATION OF DELAWARE.

SAFETY DEVICE FOR MOTION-PICTURE-PROJECTING MACHINES.

1,191,224.      Specification of Letters Patent.      Patented July 18, 1916.

Application filed January 6, 1913. Serial No. 740,379.

*To all whom it may concern:*

Be it known that I, NICHOLAS POWER, a citizen of the United States, residing in Brooklyn, county of Kings, and State of New York, (whose post-office address is No. 388 Jefferson avenue,) have invented new and useful Improvements in Safety Devices for Motion-Picture-Projecting Machines, of which the following is a specification.

This invention relates to safety devices for motion picture projecting machines, and particularly to mechanism for eliminating the chief causes of the film catching fire.

In motion picture projecting machines, as now almost universally constructed, the essential elements consist of a lamp and lenses for projecting the picture, a frame having an aperture corresponding in size with the individual pictures on the film strip, a shutter for periodically cutting off the light between the lens and the screen, and a feed mechanism acting during such period to intermittently feed the successive pictures into registration with the projection aperture. The lamps employed in such apparatus are usually powerful arc lamps or other intense lights, sufficient when concentrated upon the same portion of the film for any appreciable time to cause the same to ignite and perhaps cause a serious accident, for even though the fire may be extinguished before material damage is done, the smell of the burning film in the theater and the momentary projection on the screen of the image of the fire not infrequently causes a panic among the spectators. To prevent such ignition when the machine is not in operation, most machines are provided with a door or "fire shield" hinged above the projection aperture and connected with the driving mechanism so as to close the aperture the moment rotation of the driving shaft ceases. It sometimes happens however, particularly with previously used, worn, or spliced films, that the film will remain stationary with the same portion over the aperture long enough to be heated to the point of ignition, although the operator may continue operating the mechanism in the usual manner, thereby keeping the fire shield open.

The object of my present invention is to provide means operating automatically on the breaking of the film, the failure of the feed mechanism, or from any other cause of the films remaining stationary for an abnormal length of time, to cut off the light from the projection aperture and thereby prevent the film becoming heated to the point of ignition.

In the embodiment of my invention illustrated in the accompanying drawings, and described in the following specification, I accomplish this result by the provision of a novel stop mechanism operated by a variation in the tension of the film between the upper continuously operating sprocket and the intermittent sprocket to stop the entire machine so the fire shield will close in the normal manner, but the result may be accomplished by stopping merely the portion of the machine which controls the fire shield or by operating the present fire shield or a supplementary shield without stopping the machine at all, and it is to be understood that my invention is not limited to the construction here shown. So far as I am aware I am the first to provide mechanism of any kind in a motion picture machine to eliminate the defects noted, and the appended claims are to be construed broadly in accordance with the spirit of the law.

In the accompanying drawings, Figure 1 is a vertical section through the head of a motion picture machine equipped with my improved stop mechanism. Fig. 2 is a plan view partly in section of a portion of the mechanism shown in Fig. 1. Fig. 3 is a view generally similar to Fig. 2 but showing a slight modification. Fig. 4 is a sectional detail view of the mechanism shown in Fig. 3. Fig. 5 is a detail view of an automatic circuit breaker that may be used either with or without the mechanical stop mechanism. Fig. 6 is a sectional view of a slightly modified detail of the construction shown in Fig. 1. Figs. 7 and 8 are views illustrating two common faults in used motion picture films which tend to cause the accidents my improved mechanism prevents.

Referring now to the drawings in which like characters indicate like parts throughout the several views, 1 indicates the frame of the machine in which is mounted as shown diagrammatically in Fig. 1 the main driving shaft 2 to which is connected the usual operating handle, not shown. Attached to the shaft 2 is the main driving gear 3 from which is continuously driven by suitable intermediate gears 4ᵃ a first or upper feed sprocket 4 for the film 5. The film passes downward and past the projection apertures 6 in the frame, between the guide springs 7 and the rear wall 8 of the head to the intermittently operated sprocket 9. This sprocket is operated from the shaft 2 by means of suitable gearing including a Geneva or other intermittent movement 10 at a speed such that the length of film normally fed intermittently by the sprocket 9 is equal to the length fed continuously by the sprocket 4 in the same interval. Beneath the sprocket 9 a lower continuously driven sprocket 11 for feeding the film to the take up reel is provided, this sprocket being driven by suitable gears 11ª in synchronism with the sprocket 4 so that the film may be threaded in the machine with suitable loops or slack between the several sprockets and such loops will be maintained as long as there is no slip of the film on any of the sprockets or other interruption to the normal feed.

In Fig. 1 I have shown in full lines at 12 and in dotted lines at 12ª the two positions of the fire shield when the machine is stopped and when it is in motion respectively. Any of the improved mechanisms now in use for this purpose may be employed with the stop mechanism I have illustrated, for instance the centrifugal clutch 13 on the spindle of the shield driven from the main shaft 2. At 13ª I have indicated an electric arc as a conventional light, which in practice is of course mounted in the usual lamp-house with suitable condensers, etc.

The mechanism so far described constitutes essential elements of a motion picture machine of ordinary construction, and I will now describe the construction and operation of my improved stop mechanism as applied to it. The upper sprocket 4 is fast to a spindle 14 which is rotatably mounted in a bearing 15 in the frame 1 and projects beyond the same to receive the driving gear 4ª. A gear 16 is attached to the spindle 14 adjacent the bearing 15 and loosely mounted on the shaft between the gear and the bearing is a ratchet wheel 17. The ratchet wheel 17 is provided with a recess in its face adjacent the gear wheel in which is seated a coil spring 18 having one of its ends attached to the ratchet wheel, and its other end connected to the spindle 14. Pivoted to the frame in position to engage the ratchet wheel is a pawl 19 provided with a spring 20 to hold the pawl normally out of engagement with the ratchet and also with a rearward extension 21 lying under a pin 22 projecting from the side face of an arm 23 which is rotatably mounted on the bearing 15 concentric with the spindle 14. The end of the arm which carries the pin 22 is provided with a weight 23ª and in the end of the arm on the opposite side of the bearing there is rotatably mounted a spindle 24 having attached to its end a gear 25 meshing with the gear 16. Projecting eccentrically from the face of the gear 25 are two diametrically opposite pins 26 on which are mounted rollers 27 which engage the underside of the film in the loop between the sprocket 4 and the guide roller 28, the loop being of a length to normally hold the arm in substantially horizontal position at all times, the rotation of the pins 26 causing the path of the film to vary in synchronism with the intermittent action of the sprocket 9. It will be noted that the sprocket 9 makes four intermittent movements to each complete rotation and the sprocket 4 is the same diameter as the sprocket 9. Hence the gear 25 carrying the two pins 26 and therefore effecting two "take up" operations for each rotation, is driven at twice the speed of the sprocket 4.

The operation of this form of the mechanism will now be described. Suppose the film being exhibited contains a defective splice as illustrated at 29 in Fig. 8. Such a splice if it holds together sufficiently to be wound on the reel will usually pass the sprocket 4 without separating, for the pull of this sprocket is uniform and the resistance offered by the film is slight. When however the splice reaches the projection aperture its double thickness beneath the springs 7 offers such resistance that the sudden pull of the intermittent feed not infrequently causes the splice to part leaving the end of the film in the path of the intense light and heat of the lamp. The moment however the advanced end of the film stops, the loop in the film engaged by the pins 26 enlarges, thereby permitting the weight 23ª to drop so that the pin 22 engages the end of the pawl, forcing its tooth into engagement with the ratchet wheel, stopping the rotation of the ratchet wheel and opposing the resistance of the spring 18 to the further rotation of the spindle 13, thereby stopping the machine without shock or jar and allowing the fire shield to close in the usual manner before the heat from the lamp can possibly ignite the film.

Another common defect in used films is the destruction of the sprocket holes in the margins of the film as indicated at 29ª in Fig. 7. A film so mutilated will have sufficient frictional engagement with the sprocket 4 to be fed by it but will slip on the intermittent sprocket leaving the film stationary at the projection aperture where it would shortly ignite if the stop mechanism did not operate as described to permit the fire shield to close.

In Figs. 3 and 4 I have shown a slight modification of the film engaging mechanism carried by the arm 23. Instead of the pins 26 attached to the face of the gear I form the spindle 24 with a prolongation 24ª and attach to it two cams 30 shaped to vary the path of the film in exact accord with the intermittent movement of the film so that the arm 23 remains stationary during the normal operation of the machine instead of oscillating up and down as would be the case if the films engaged the spindle 24ª directly. As the cams have but one "take up" action for each rotation they are driven at four times the speed of the sprocket 4.

In Fig. 5 I have illustrated a circuit breaker which may be employed when the projecting machine is driven by an electric motor. Fast to the arm 23 is an insulated contact piece 31 engaged when the arm is horizontal by a spring contact 32 insulated from the machine by a block 34. The current for driving the motor passes through the contacts so that when the arm drops the circuit will be broken and the motor stopped. This device may be used alone or in connection with the mechanical stop and it may also be used if desired to cut off the current to the lamp of the machine either alone or in connection with the stop mechanism.

A further slight modification is illustrated in Fig. 6 in which structure the spring connection between the ratchet 17 and the spindle 14 is dispensed with and in place thereof a frictional connection is provided comprising a leather washer 35 seated in the recess in the face of the ratchet and held against the face of the gear 16 by a disk spring 36 between the gear and the ratchet. When the ratchet is stopped by the pawl in the manner described the washer 35 acts as a brake on the gear and offers such resistance to rotation that the operator cannot turn the machine fast enough for the centrifugal clutch 13 to keep the shield open.

I have described two of the most common causes of failure of the feed mechanism but it will be understood that any accident or defect which causes the film to remain an unusual time at the projection aperture, such for instance as the breaking of the pin of the Geneva movement, will cause the machine to stop and the fire shield to close before possibility of damage. I have mentioned several ways in which the light can be cut off without stopping the machine but I prefer to stop the entire machine as such stopping calls the operator's attention to the defect immediately before the exhibition has been long delayed and before the broken film has run off the sprocket so as to necessitate re-threading the machine.

Having thus described my invention, what I claim and desire to secure by Letters Patent is:—

1. In a motion picture projecting machine, the combination of successive film feeding devices operated to maintain a loop of film between them and for varying the dimensions of said loop, means for driving said devices, means for rendering one of said devices inoperative, said means having control mechanism comprising a film-engaging member normally engaging said film in the loop thereof and operating upon an abnormal variance in the size of the loop to render said driving means inoperative.

2. In a motion picture projecting machine, the combination of successive film feeding devices operated to maintain a loop of film between them, means for driving said devices, means for rendering one of said devices inoperative, and means for controlling said last named means comprising a film-engaging member positioned to be normally engaged by the film in the loop thereof and operating upon an abnormal enlargement of the loop to render said driving means inoperative.

3. In a motion picture projecting machine, the combination of successive film feeding devices operated to maintain a loop of film between them, means for driving said devices, means for rendering one of said devices inoperative, and means for controlling said last named means comprising a film-engaging member positioned to be engaged by the film in the loop thereof and a connection between said film-engaging member and said means to operate the latter upon movement of said connection, said film-engaging member being constructed to maintain its engagement with said film during a limited variance in the size of said loop without moving said connecting member.

4. In a motion picture projecting machine, the combination of successive film feeding devices for feeding the film across a path of light, means controlled by said film feeding devices for cutting off said light, means for driving said film feeding devices to maintain a loop of film between them, said driving means comprising a main driving shaft having geared driving connections with said film feeding devices, means for rendering one of said devices inoperative comprising a member adapted to engage and stop one element of said geared driving connections, and means for actuating said last named means comprising a member to be engaged by said loop of film and having a mechanical connection with said last named member.

5. In a motion picture projecting machine, the combination of successive film feeding devices for feeding said film across the path of light, means for cutting off the light from the film, means for driving said devices to maintain a loop of film between them, said driving means comprising a main driving shaft having geared driving connections with said film feeding devices, means for rendering said devices inoperative and simultaneously cutting off said light, comprising a member adapted to engage and stop one element of said geared driving connections, and means for controlling said last named means comprising a film-engaging member having direct mechanical connection with said last named member.

In witness whereof I have hereunto set my hand at the city, county and State of New York, this 31st day of December, 1912.

NICHOLAS POWER.

Witnesses:
W. B. MORTON,
L. E. JOHNSTON.